United States Patent [19]

Balmer

[11] 4,283,635

[45] Aug. 11, 1981

[54] LOAD DEMAND CONTROL SYSTEM

[75] Inventor: Alden M. Balmer, New Brighton, Minn.

[73] Assignee: Honeywell Inc., Minneapolis, Minn.

[21] Appl. No.: 60,304

[22] Filed: Jul. 25, 1979

[51] Int. Cl.³ .............................................. H01H 43/00
[52] U.S. Cl. ........................................ 307/35; 307/38; 307/141
[58] Field of Search ................. 307/31, 35, 38, 39, 307/41, 141, 141.4, 126

[56] References Cited

U.S. PATENT DOCUMENTS

| | | | |
|---|---|---|---|
| 3,714,453 | 1/1973 | Delisle et al. | 307/39 |
| 3,862,430 | 1/1975 | Lenhart et al. | 307/35 |
| 3,872,286 | 3/1975 | Putman | 307/52 X |
| 3,925,680 | 12/1975 | Dixon | 307/39 |
| 3,984,699 | 10/1976 | Bailey | 307/41 |
| 4,167,679 | 9/1979 | Leyde et al. | 307/35 |

OTHER PUBLICATIONS

Honeywell, "Load Management System W977A, BC", 12-77 Form number 60-2436.

Primary Examiner—L. T. Hix
Assistant Examiner—James L. Dwyer
Attorney, Agent, or Firm—Clyde C. Blinn

[57] ABSTRACT

A load demand control system for limiting the total average electric load over a moving predetermined time interval to an installation having at least one large load device, making use of a timer control which can be selectively operated by an operator upon the need for the operation of the one large electrical load. The timer control first resets the control point of the load demand control of the installation at some low predetermined value. Subsequently, the timer control turns on the large load for a predetermined period of time and after its operation, the timer control maintains the low predetermined value of the load demand control for a further predetermined time period whereby the total moving average electrical load to the installation for the total time interval of the timer control is maintained below a predetermined peak electrical load value set for the installation.

9 Claims, 4 Drawing Figures

LOAD DEMAND CONTROL SYSTEM

BACKGROUND OF THE INVENTION

For many years load demand control systems have been in use; however, with the recent increase in the cost of electrical power, load demand control systems are becoming more of a necessity for installations wherein a number of electrical loads are used. It is possible to shed certain electrical loads during certain periods of time to maintain the average electrical load input to the installation below some predetermined value. Specifically, a conventional demand control system senses the incoming power to an installation and controls the number of operating loads to maintain the incoming power below some predetermined value. If a particular load is to be operated and has priority over the other loads, upon the operation of the priority load, the demand control system would turn off or shed other loads which have a lower priority to maintain the incoming power demand within certain limits.

As most electric utility companies charge commercial users for the total kilowatt hours of electrical energy used in a given period, such as each month at a rate depending upon the peak kilowatts of power averaged over any short interval of time, such as fifteen minutes, during any time each month, it is important to reduce short peak loads.

When a commercial user or an installation has a large electrical load that must be periodically energized, it is not always possible to shed other loads to the extent necessary to keep the total kilowatt energy use for any interval as low as desired. There is an incentive for a commercial user to anticipate the operation of large loads and reduce the electrical load peaks which extend over portions of a preselected time interval.

SUMMARY OF THE INVENTION

The present invention is concerned with a load demand control system for maintaining the average electrical power use for any time interval (known as the moving time interval) of an installation below some average limit or peak by anticipating the operation of a large electrical load device which would unduly raise the average electrical load demand with conventional load shedding. Specifically, the load demand control system makes use of a timer control which is operated each time the large electrical load device is to be operated. The timer control resets the control point of the load demand control to cause it to shed other low priority loads for a predetermined period of time before, during and after the operation of a larger load. After operating under the lower load demand level for the first predetermined period of time, the timer control brings on the operation of the larger load for an intermediate period of time; so that, the average for a preselected time interval is well within the required limits.

DESCRIPTION OF THE PREFERRED EMBODIMENT

Figure 1:
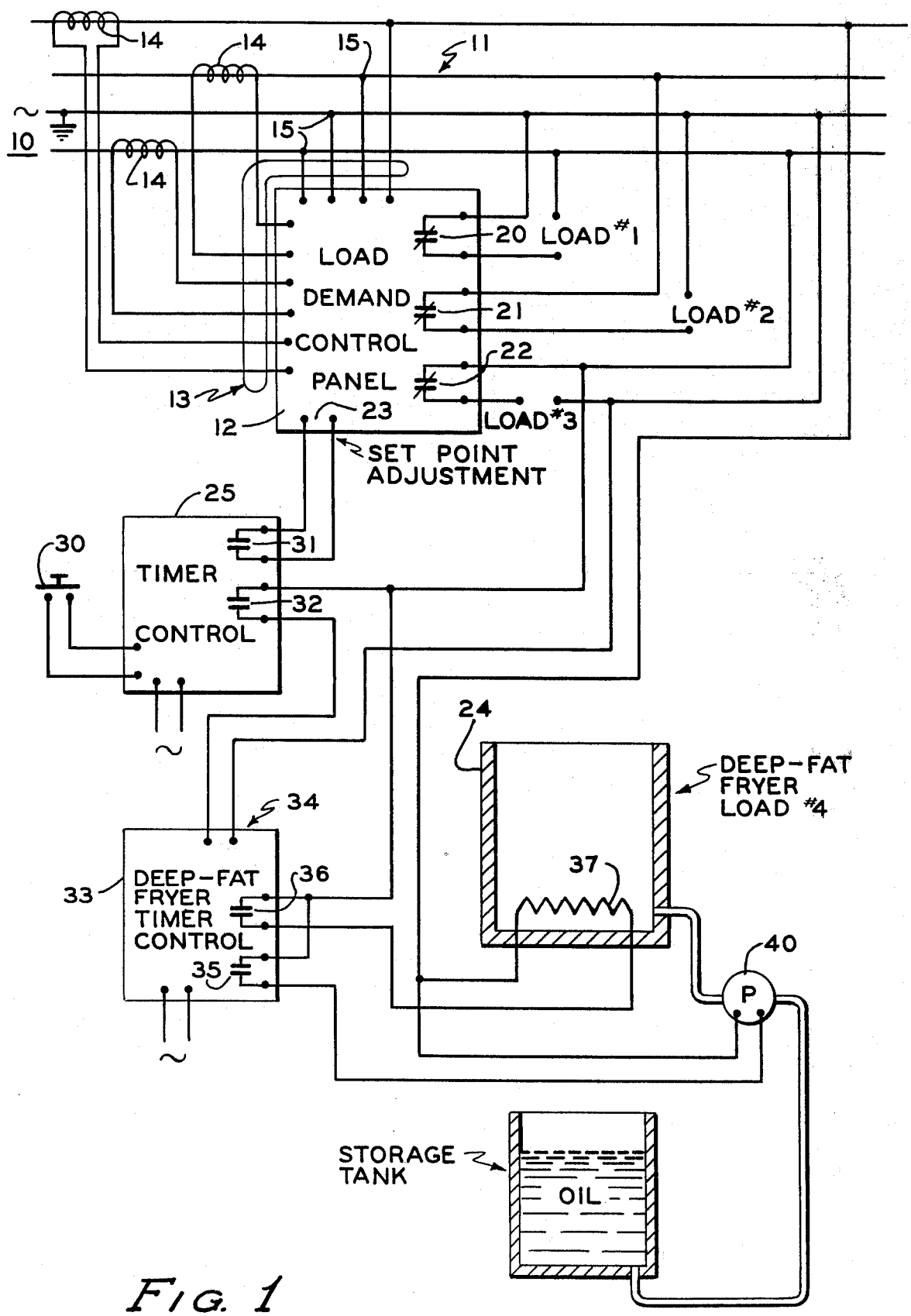
FIG. 1 is a schematic representation of the load demand control system wherein the timer is used to commence the operation of a particular large load installation.

Referring to FIG. 1, a load demand control system is shown for an installation such as a deep fat fryer in a fast food outlet, which receives power from a conventional three phase power source 10 over the electric power distribution wires 11. A load demand panel 12 of a conventional type, such as the W977A DEMAND CONTROL manufactured by Honeywell Inc. has an input circuit or sensing circuit 13 for receiving a signal indicative of the input electrical power over wires 13 to the installation. Specifically, the input circuit 13 has current sensors 14 and voltage taps 15 which are connected to provide a signal indicative of the incoming electrical power or kilowatts to the panel 12. The panel has a plurality of switches or relays 20, 21 and 22 which are connected to control the operation of different loads such as loads #1, #2 and #3 so that when the incoming power to the installation exceeds some predetermined value as can be preselected, the load demand control panel can operate the switches and turn off certain loads to cut down the incoming power demand from source 10. A setpoint input circuit or input power reset control 23 provides for an adjustment or change in the predetermined input electrical power to be maintained by the load demand control system.

Figure 2:
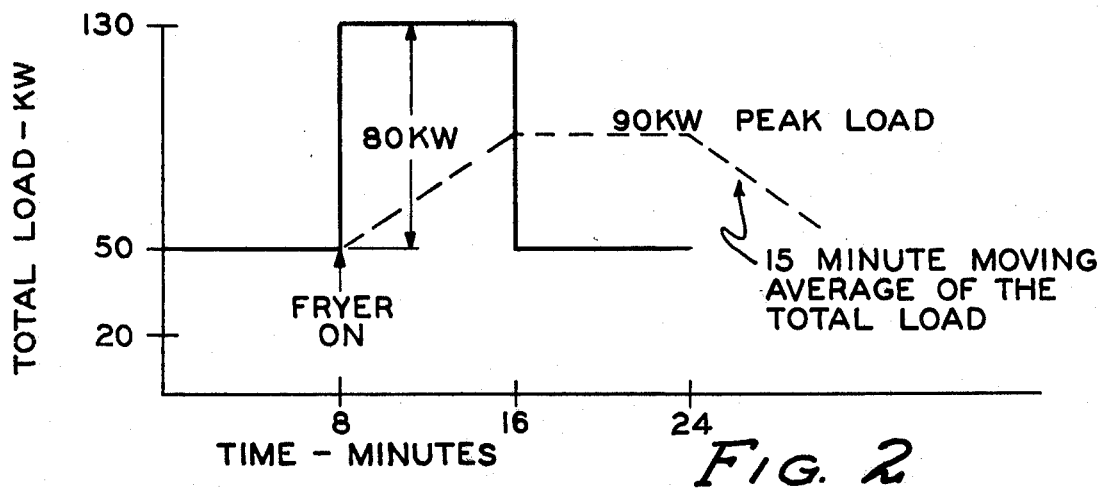
FIG. 2 is a graphical representation of the average total load for a period of time for the particular installation showing a 90 kw peak load without a load demand control system.
Figure 3:
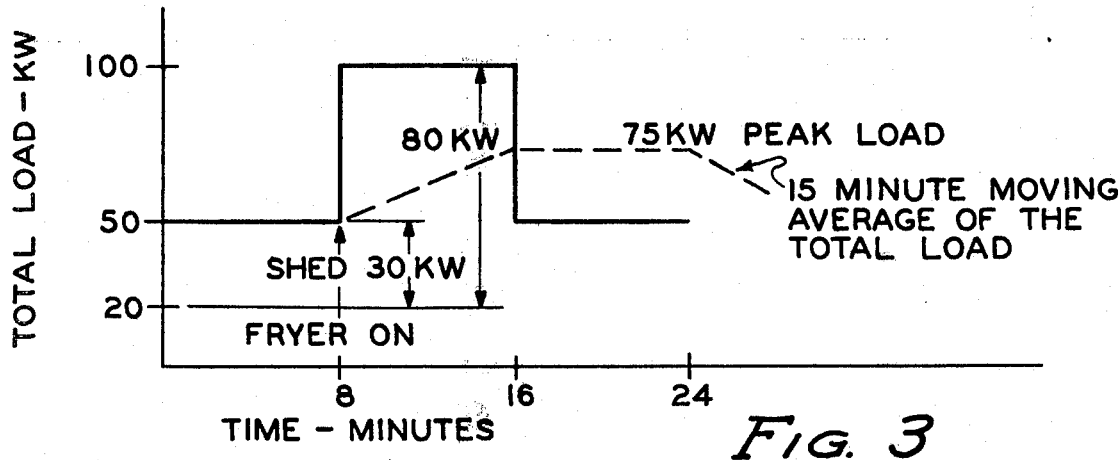
FIG. 3 is a graphical representation of the average total load for a period of time for the particular installation showing a 75 kw peak load using a conventional load demand control system.
Figure 4:
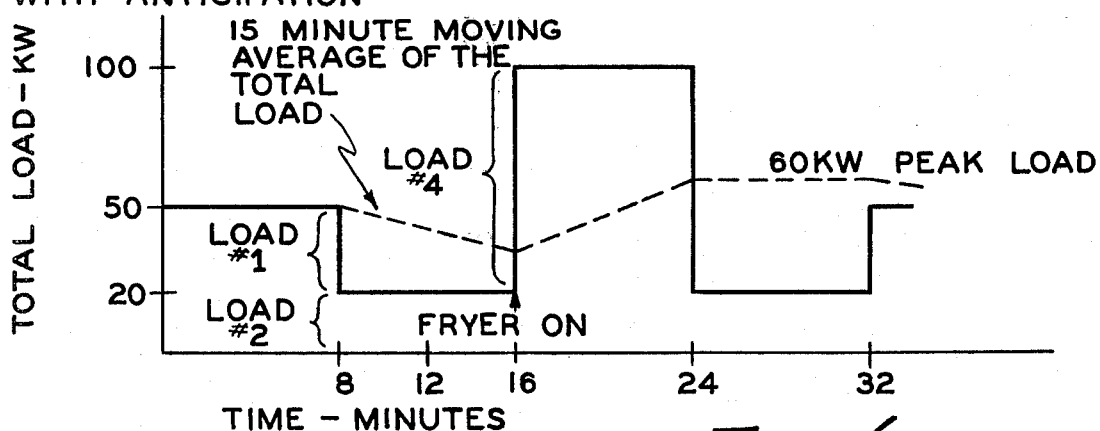
FIG. 4 is a graphical representation of the average total load versus time showing a 60 kw peak load using the present invention.

In the particular installation used with the load demand control system of this invention, a large electrical load is being controlled, such as load #4. Load #4 is a deep fat fryer 24 which when once started for a preselected time of operation cannot be shed by a load demand control panel. As the power company measures the power or kilowatt average over a certain period of time such as a fifteen minute interval, the dotted line in FIGS. 2, 3 and 4 show a fifteen minute moving average of the total load. A timer control 25 is used to anticipate the operation of load #4 to reduce the electrical power demand over the line for a first predetermined period of time by resetting the control point of panel 12 at input 23. For a first predetermined period of time such as the first eight minutes, other loads are shed and the deep fat fryer load is subsequently energized. Thereafter for a second predetermined period of time, such as eight minutes, the load is again reduced. Thus the average of the total load over any fifteen minute time interval will be maintained below certain predetermined limits.

Specifically, a manual switch 30 controls the initiation or operation of timer control 25 which is a conventional timer for operating switches or contacts 31 and 32. Upon the operation of the timer, switch 31 is first closed to reset the control point of load demand control panel 12 for a first predetermined period. Switch 32 is subsequently closed approximately four minutes later to commence operation of a second timer control 33. Control 33 is normally a part of the deep fat fryer installation or load #4 and has a starting circuit 34 which can be connected to switch 32.

Control 34 is a conventional timer to operate switches 35 and 36 in sequence. Switch 35 first closes upon closure of circuit 34 to energize pump 40 to pump the stored oil into fryer 24. Subsequently, such as four minutes later, switch 36 closes continuously for eight minutes to operate the fryer 24. Upon termination of the fryer operation at the end of the eight minutes, by switch 32 opening, switches 35 and 36 open and the oil will drain back to the storage tank to be held for another operation.

Timer control 25 maintains switch 31 closed for another eight minutes to keep the load demand panel reset for a second predetermined period before terminating its operation.

OPERATION OF THE INVENTION

Assuming that the heater 37 of the deep fat fryer requires approximately 80 killowatts (kw) of electricity, without a load demand control of any type, the operation would be as shown in the graphical representation in FIG. 2. With a normal total load of 50 kw, upon the operation of the deep fat fryer for an eight minute time period, the total demand would increase to 130 kw and if persistent for the next eight minutes, the average power over any fifteen minute moving interval would peak to approximately 90 kw.

With a conventional load demand control system, an operation as shown in FIG. 3 takes place. Assuming that the average load for the first eight minutes was 50 kw, upon the operation of the deep fat fryer to add the additional 80 kw, the demand control sheds all low priority loads, which in this case is approximately 30 kw. For the next eight minutes, the load is 100 kw to provide the average power over any fifteen minute interval to peak at 75 kw.

With the present invention using a load demand control system with anticipation, the average total power demand (shown by the dashed lines in FIG. 4) over any fifteen minute moving interval is substantially reduced to have a 60 kw peak load. Referring to the graphical representation in FIG. 4, assume that the average load was 50 kw with loads #1 and #2 in operation as shown in FIG. 1. Upon the need for operation of the deep fat fryer load #4 or heater 34, the operator pushes button 30 to commence the operation of timer control 25 and thus the timing sequence. Initially, the timer control closes switch 31. Switch 31 provides for a setpoint adjustment of the load demand control panel to reduce the value of the predetermined load allowed to be drawn from the power source 10 which instantly requires that the load demand control panel shed other low priority loads. Assuming that load #1 is a low priority load, switch 21 of panel 12 opens and load #1 is deenergized to drop the total load to the installation to a 20 kw level as shown at the eight minute time. The fifteen minute moving average of the total load begins to drop as shown by the dashed line. Four minutes later, switch 32 of the timer control closes the circuit for operation of the deep fat fryer. Switch 32 of timer control 25 actually replaces a momentary normal start button of the existing deep fat fryer timer control 33 which is a part of the deep fat fryer installation.

The deep fat fryer then operates normally under control 33 to first pump oil into fryer 24 for four minutes and then operate heater 37 for eight minutes. The deep fat fryer operation cannot be interrupted. When timer cntrol 33 finishes its operation at the sixteen minute time of FIG. 4, switches 35 and 36 open. At the termination of the operation of the deep fat fryer, the total load is then reduced to 20 kw and maintains such for the next eight minutes until the total time period of 32 minutes is reached. As can be seen by the dotted line in FIG. 4, the fifteen minute moving average of the total load at no time exceeds a 60 kw peak level for any fifteen minute interval of time.

By use of the anticipation control, the average kw peak is much lower than the conventional demand control and the cost of electrical power to the user is greatly reduced. With a large load operated even for a short period of time, less loads would need to be shed to reduce the average total load over any time interval. The large load operation would have to be less than the fifteen minute time interval used by the utility company for load average measurement.

The embodiments of the invention in which an exclusive property or right is claimed are defined as follows:

1. In a load demand control system for limiting the total average electrical load, for a predetermined moving interval of time, to an installation having at least one large electric load device to be operated a portion of an interval of time, comprising, load demand control means having an input electrical power sensing means for sensing the input power to an installation and a plurality of load control circuits for selectively controlling various loads of the installation to shed loads when said input power exceeds a first predetermined value, timer control means selectively operated when the one large electric load device is to be operated, said timer control means comprising, first means for resetting said first predetermined value of said load demand control means to a second predetermined value to cause said load demand control means to shed loads to maintain the input power below said second predetermined value for a first predetermined time period, and second means adapted to be controlled by said timer control means to subsequently initiate operation of said large load device after said first predetermined time period for a second predetermined time period, whereby the total average input power for a predetermined moving interval of time is maintained at a minimum value.

2. The invention of claim 1 wherein said timer control means maintains said second predetermined value for a third predetermined time period after said large load device is de-energized whereby the total average input power for a predetermined moving interval of time is maintained at a minimum value.

3. An improvement in a load demand control system having an input power sensing means for sensing the total electrical demand of an installation for maintaining the total average electrical power load over a predetermined moving interval of time below a predetermined value wherein upon the operation of a large electrical load for a portion of the time interval other loads having lower priority are shed, the improvement comprising, timer means operated upon the anticipation of a need of an operation of a large load to delay the energization of said large load for a selected time during a time period and to control the shedding of certain of the other loads at the beginning of said time period prior to the energization of said large load to maintain a low average power load after the large load is deenergized over the total interval of said time period.

4. The invention of claim 3 wherein said timer means also controls the shedding of certain of said other loads during a time period after the operation of said large electrical load has terminated.

5. In a load demand control system for limiting the total average electric load for a predetermined moving interval of time as determined by a power supplier for an installation having at least one large electrical load device to be operated for a total time period less than the predetermined moving interval of time, comprising, load demand control means for controlling a plurality of electrical loads in response to the total input power of an installation to maintain the average total power for a predetermined moving interval of time taken and any time at a minimum, timer control means operated on anticipation of the need of operation of the large electrical load device, said timer means first resetting a control point of said load demand control means to reduce the input electrical power use of the installation for a first period of time by shedding low priority electrical loads and then energizing said large electrical load device for a period of time less than said interval.

6. The invention of claim 5 wherein, said timer means after terminating said large electrical load device further maintains said resetting control of said load demand device for a time period whereby any measurement of the average input power for any predetermined interval of time shows a minimum average input power demand.

7. The invention of claim 5 wherein said interval is fifteen minutes as set by a power utility company and said large load device is operated only a portion of said time interval whereby at said low shedded load operation before and after said large load device provides an average effect regardless of where said interval is taken.

8. In a load demand control system for limiting the average total over a predetermined power measuring period of time the electrical load of an installation by anticipation, the operation of at least one large load device having an operation controlled by a timer device, comprising a load demand control means having means adapted for sensing the incoming electrical load of an installation and relay means adapted for connection to various electrical loads of the installation for shedding the loads when the incoming electrical power to the installation exceeds a first predetermined value as selected by a reset control circuit, timer control means having a plurality of switch means controlled in sequence upon the energization of said timer control means upon anticipation of the need of operation of one of the large load devices, a first of said plurality of switch means being connected to said reset control circuit to change said first predetermined value to a second lower predetermined value of incoming electrical power, controlled by said load demand control means, a second of said plurality of said switch means being adapted to be connected to the timer device to subsequently start the operation of the one large load device, said first switch means maintaining said lower predetermined value for a first time period before the operation of the one large load device so that when the large load device is energized by its timer device the average incoming power to said installation will be lower throughout the operation of the large load device.

9. The invention of claim 7 wherein said timer control means maintains said second lower predetermined value of incoming electrical power for a second time period after the completion of the one large load device by the timer device so that the average incoming power over any predetermined power measuring period of time is maintained at a minimum low value.

* * * * *